April 28, 1970  T. R. CASSEL  3,508,770
PIPE COUPLING
Filed Nov. 24, 1967  2 Sheets-Sheet 1

INVENTOR.
Thomas R. Cassel
BY George A. Schmidt
ATTORNEY

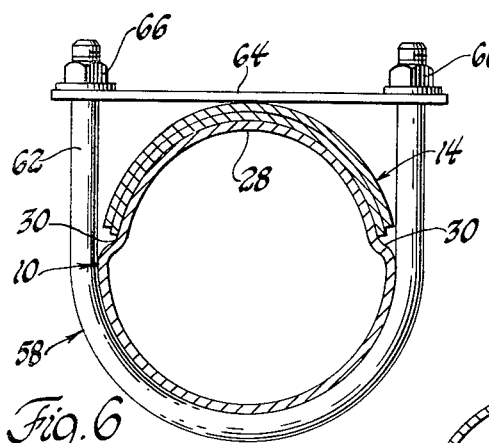
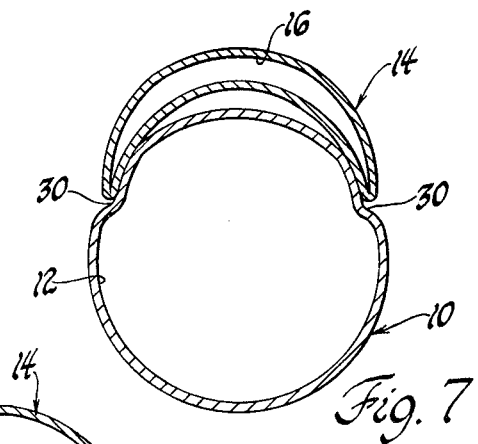
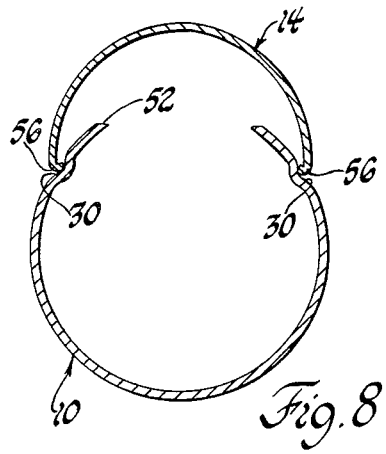
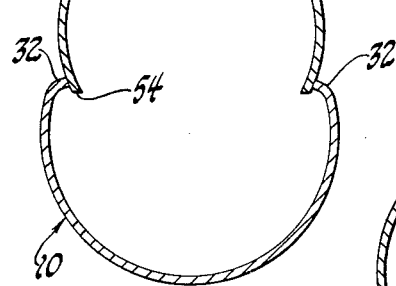
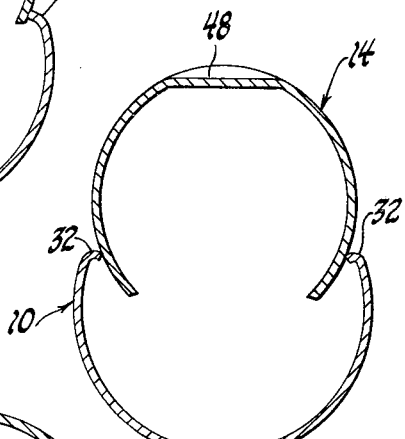
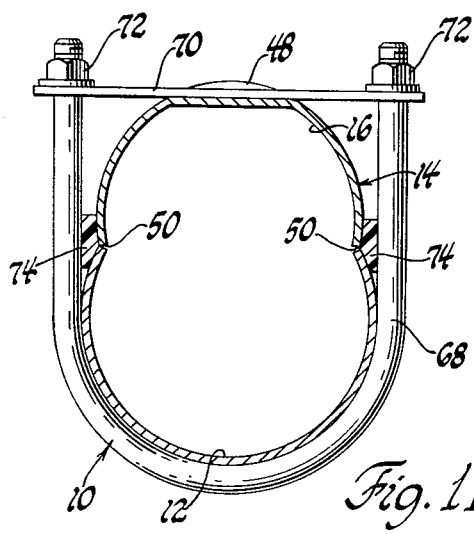
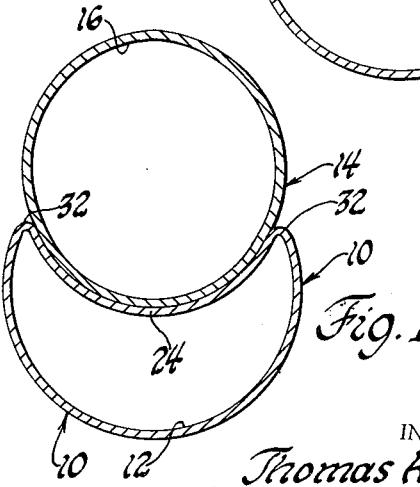
INVENTOR.
Thomas R. Cassel
BY George A. Schmidt
ATTORNEY

United States Patent Office 3,508,770
Patented Apr. 28, 1970

3,508,770
PIPE COUPLING
Thomas R. Cassel, Birmingham, Mich., assignor to Torca, Inc., Birmingham, Mich., a corporation of Michigan
Filed Nov. 24, 1967, Ser. No. 685,493
Int. Cl. F16l 41/00
U.S. Cl. 285—189                                 12 Claims

ABSTRACT OF THE DISCLOSURE

There is provided an improvement in pipe couplings of the type wherein a branch pipe approaches a through pipe at an angle and is secured thereto for fluid flow through both the through pipe and the branch pipe. The improvement includes a transverse slot formed in the through pipe and a portion of the pipe adjacent the slot being inwardly deformed and angularly disposed relative to the axis of the through pipe, such portion being inwardly arcuate. A transverse slot is made in the branch pipe and spaced from the end thereof, a portion between the end of the pipe and the transverse slot being collapsed inwardly toward the opposite wall of the pipe, such portion being arcuate and disposed at an angle relative to the axis of the branch pipe. The two pipes are assembled such that the undeformed portion of the branch pipe engages the deformed portion of the through pipe, the deformed portion of the branch pipe engages the undeformed portion of the through pipe, and with the edges of the slots being in abutting relation. Clamping means are provided to secure the branch pipe to the through pipe.

---

This invention relates to pipe couplings, and more particularly to a pipe coupling adapted to secure a branch pipe to a through pipe where said branch pipe approaches the through pipe at an angle.

In the design and manufacture of many piping or conduit systems it is necessary to provide pipe connections for branch pipes which approach other pipes at some angle, to permit the branch pipe to communicate with the interior of such other pipe and provide a flow passage. Typical of such piping or conduit systems is the exhaust system of an automotive vehicle, wherein a through pipe extends rearwardly from an exhaust manifold at one side of an engine and a second pipe extends from the exhaust manifold at the opposite side of the engine. At some point it is desirable that the second exhaust pipe be connected to the through pipe rearwardly of the engine for common flow and discharge to the atmosphere at the rear of the vehicle. In such a situation, and depending on the understructure of the vehicle, the second exhaust pipe approaches the through pipe at an angle and a suitable connection must be made to permit flow of exhaust gasses in each of the exhaust pipes.

The usual pipe coupling construction for a situation as above described involves relatively complicated openings being formed in one or both of the pipes to be connected, and some sort of cumbersome joining means to secure the two pipes together. The complicated openings formed in the through pipes must be precisely formed in accordance with the angle of approach of the branch pipe, and must be extremely carefully designed so that no leaks will occur when the two pipes are coupled. Oftentimes the leakage problem is avoided, even though the openings and the like are relatively imprecise, by an expensive and time consuming welding procedure, the weldment covering any openings where leakage might occur. Where it is desired to avoid the expense of the weldment, or where later disconnection or uncoupling might be necessary, some sort of complicated fastening device is used to completely secure the branch pipe to the through pipe in such a way as to provide a seal around the joint. This is a difficult and time consuming operation, particularly when such couplings are used in production assemblies and where time is an important factor. Under such conditions, the leakage problem is prevalent. Furthermore, both the welding and fastening operations are difficult to accomplish unless the branch pipe is precisely positioned relative to the through pipe when the coupling is made.

The device in which this invention is embodied comprises, generally, a pipe coupling in which a branch pipe approaches a through pipe at some angle and in which both the branch pipe and the through pipe are deformed so as to provide ready and easy means for securing the pipe sections together in a proper manner. The through pipe is provided with a transverse slot across a portion thereof, and a portion of the pipe adjacent the slot is arcuately inwardly deformed and disposed at an angle relative to the axis of the pipe. The branch pipe is provided with a transverse slot at a point spaced from the end thereof, the portion of the pipe between the slot and the end of the pipe being inwardly collapsed toward the opposite wall and angularly deformed relative to the axis of the branch pipe. When the two pipe sections are coupled, the branch pipe overlies and engages the deformed portion of the through pipe and the collapsed portion of the branch pipe overlies and engages the undeformed portion of the through pipe, the angular disposition of the deformations providing the proper angular relationship of one pipe relative to the other. Clamping means are then received around the pipe sections to secure the pipes together. When the pipes are assembled, the edges of the transverse slots are in abutting and overlapping relation so that the only possibility of leakage is at a very narrow point on each side of the pipe coupling. A seal of any suitable material, such as asbestos, prevents fluid from leaking through the coupling.

A coupling constructed in accordance with the foregoing brief description is extremely simple to manufacture and produce, as well as to assemble on a production basis. The deformations of the pipe sections provide through flow possibilities for fluid in each pipe section, and the problems of leakage are minimized. The precise relationship of one pipe section relative to the other is also minimized, since the broad contact of the pipe sections permits flexibility in the location of one relative to the other, thus taking up any tolerance build-up or other minor problems in the proper positioning of the pipe sections. The overall result is an extremely efficient and economical coupling for branch connections which may be easily practiced on a production basis.

These and other advantages will become apparent from the following description, used to illustrate a preferred embodiment of the present invention as read in connection with the accompanying drawings in which.

Figure 2:
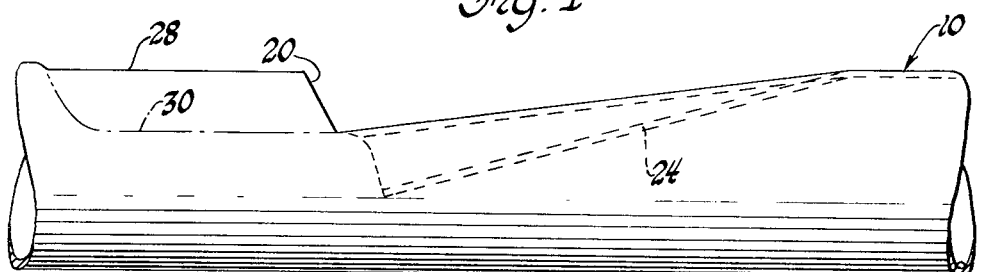
FIGURE 2 is a view of the pipe section illustrated in FIGURE 1, showing the deformation of the pipe portion adjacent the transverse slot.
Figures 3, 4:
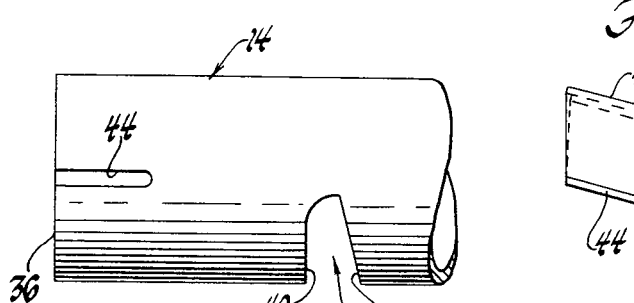
FIGURE 3 is a view of a portion of a branch pipe showing a transverse slot formed therein.
FIGURE 4 is a view of the branch pipe illustrated in FIGURE 3, showing the deformation of the pipe section.
Figure 5:
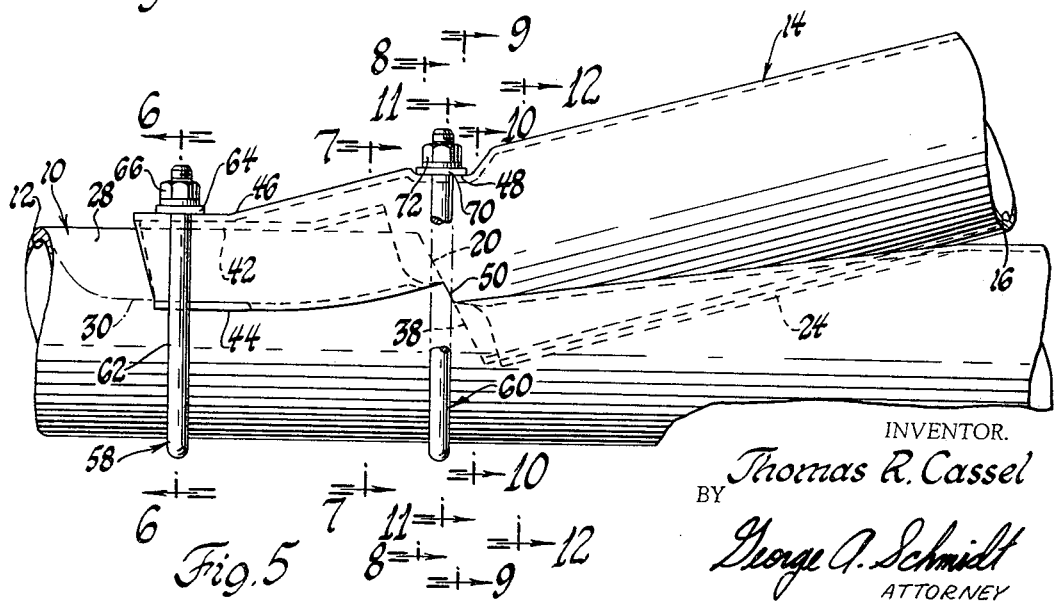

FIGURE 5 is a view of the pipe coupling utilizing the pipe sections formed as illustrated in FIGURES 2 and 4; and FIGURES 6–12 are various cross-sectional views of the pipe coupling illustrated in FIGURE 5, taken respectively along the lines 6—6 through 12—12 of FIGURE 5 and looking in the direction of the respective arrows.

Referring more particularly to the drawings, wherein the showings are for the purpose of illustrating a preferred embodiment of the invention and not for the purpose of limiting same, FIGURE 5 best illustrates the overall coupling in which a through pipe, indicated generally by the numeral 10 and having a fluid flow opening 12 therein, is to have connected thereto a branch pipe, indicated generally by the numeral 14 having a flow passage 16 therein. It is to be noted that the longitudinal axis of the branch pipe 14 is angularly disposed relative to the longitudinal axis of the through pipe 10, although the particular angular relationship is unimportant to the invention.

The coupling illustrated in FIGURE 5 may be used in any piping installation to carry a gaseous or liquid fluid, where the fluid is to be either combined or separated at the branch coupling. A typical example of usage of the pipe coupling illustrated in FIGURE 5 is in the exhaust system of an automotive vehicle, wherein the right-hand end of the through pipe 10 might be connected to one exhaust manifold of the vehicle and wherein the righthand end of the branch pipe 14 might be connected to the other exhaust manifold of the vehicle engine. The two pipes are connected, as illustrated in FIGURE 5, to convey exhaust gasses to the rear of the vehicle. In any event, it will be readily apparent that such a coupling may be used in other installations and for conveying fluids other than exhaust gasses.

Figure 1:
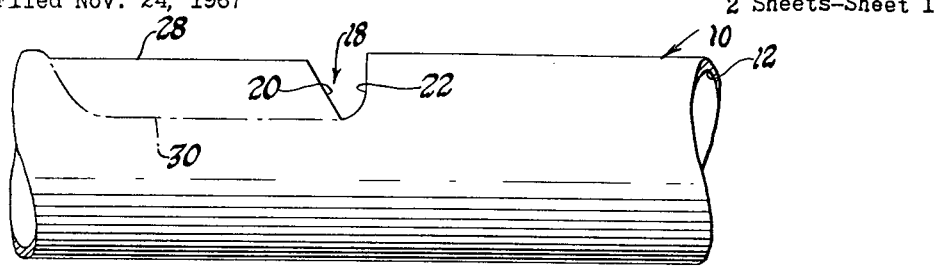
FIGURE 1 is a view of a portion of a through pipe showing the formation of a transverse slot.

With reference now to FIGURES 1 and 2, the formation of the through pipe 10 at the coupling is best illustrated. A transverse slot, indicated generally by the numeral 18, is formed transversely of the pipe 10 and extends a desired distance from the outer periphery thereof toward the center of the pipe. Slot 18 is generally V shaped, having an inclined wall 20 and a generally vertical wall 22 to provide clearance for the deformation of the pipe in preparation for the coupling. Once the slot 18 is formed transversally of the pipe 10, the portion of the pipe adjacent the slot and toward the right, as viewed in FIGURES 1 and 2, is inwardly deformed to provide an arcuate and angular ramp 24 extending upwardly from the slot 18 to the outer wall of the pipe 10. As best illustrated in FIGURE 12, the deformation is such that the portion 24 is arcuate about a center exteriorly of the pipe 10, the radius of curvature being substantially the same as the radius of the branch pipe 14, as will become hereinafter more apparent.

The portion 28 of pipe section 10 on the leftward side of the slot 18 may be slightly reduced in diameter to reduce the radius of curvature of the portion 28 for receiving the branch pipe 14 in a manner to become hereinafter more apparent. Such deformation 28 provides convenient channels 30 on opposite sides of the through pipe 10, as best illustrated in FIGURES 6–8, to receive and engage the branch pipe 14.

At the right hand side of slot 18 in the through pipe 10, the downward deformation of the pipe 10 creates curled edges 32 at the arcuate ramp 24, as best illustrated in FIGURES 9, 10 and 12, for purposes to become hereinafter more apparent.

FIGURES 3 and 4 best illustrate the deformation of branch pipe 14. A similar slot, indicated generally by the numeral 34, is formed in the pipe section 14 and is spaced from the end 36 thereof, such slot being generally V shaped and having an angular surface 38 and a generally vertical surface 40. The portion of the pipe 14 between the slot 34 and the end 36 is collapsed inwardly toward the opposite wall of the pipe 14 and angularly disposed relative to the axis of the pipe 14 to provide a ramp or inclined arcuate surface 42 within the end of the pipe 14. A slot 44 may be provided in end 36, if necessary, to accommodate the extreme deformation and complete collapse of the pipe section. When fully collapsed, the inner surface of the pipe section 14 will have a radius of curvature substantially the same as the portion 28 of the through pipe 10 so as to overlie and engage as closely as possible the portion 28, as will become hereinafter more apparent. In order to provide the inclined or angular surface 42 within the end of pipe section 14, the end part 46 of pipe section 14 is angularly upwardly formed relative to the axis of the pipe section 14.

At the opposite end of pipe section 14 from the slot 34 an inward deformation 48 is provided, the angularity thereof being substantially the same as the angularity of end part 46, for purposes to become hereinafter more particularly described.

Referring again to FIGURE 5, which illustrates the disposition of branch pipe 14 relative to the through pipe 10 upon coupling the pipe sections together, it may be seen that the undeformed portion of pipe 14, to the right of the transverse slot 34 as viewed in the drawings, is received on and engages the arcuate upwardly inclined ramp 24 of the pipe section 10. Similarly, the inwardly collapsed ramp 42 of pipe section 14 engages the reduced diameter portion 28 of pipe section 10 leftward of the slot 18 formed in the pipe section 10. Complete movement of the pipe sections toward each other puts the edges 20 and 38 of the slots in adjacent relation, such that the inclined walls 20 and 38 are in abutting relation along portions of their length, as illustrated at 50 in FIGURE 5. Thus, there is a complete overlap of the end portion of branch pipe 14 in close fitting engagement with the through pipe 10, and a complete engagement of the portion of pipe section 14 with the ramp 24 of the through pipe 10. Because of the slots 18 and 34 in the pipe sections, an opening 52 within the through pipe 10, and an opening 54 within the branch pipe 14 are provided to permit free flow through both pipe sections.

The deformation or collapse of the end of pipe section 14 provides curled edges 56 in the portion thereof between the slot 34 and the end 36, conveniently received in the grooves 30 formed in the through pipe 10. Curled edges 32 of the through pipe 10 to the right of the slot 18 conveniently engage the side walls of pipe 14 to provide sealing edges.

In order to secure the two pipe sections together, once they are located and positioned as illustrated in FIGURE 5, spaced fastening means, such as U-bolt assemblies 58 and 60, are employed. U-bolt assembly 58 includes a bolt portion 62, formed in the conventional manner, and a saddle 64 received on the top of the end part 46 of the pipe section 14. Nuts 66 are received on the threaded ends of the U-bolt 62 in the usual way to clamp the saddle 64 against the end part 46 of the pipe section 14 and against the exterior surface of the through pipe 10. Since the end part 46 of pipe 14 is angularly disposed relative to the axis of pipe 14, and thus generally parallel to the outer surface of through pipe 10, the U-bolt assembly 58 will not slip or slide along the coupling upon tightening.

Similarly, U-bolt assembly 60 includes a U-bolt 68 and a saddle 70, the saddle being received in the angular deformation 48 in the pipe 14. The deformation 48, being at the same angle as the end part 46, creates a parallel surface on the pipe 14 to prevent slippage of the saddle 70 along the pipe as it is tightened. Suitable nuts 72, received on the threaded ends of the U-bolt 68, provide the clamping and securing force.

It will now be apparent that the only possibility of leakage through the pipe coupling, assuming proper deformation and location of the various parts, can only occur at the juncture of the inclined surfaces or walls 20 and 38 of the slots 18 and 34 respectively, where there are no curvatures, such as at 32 and 56, for line engagement of the parts. In order to prevent any leakage at these points on opposite sides of the coupling, suitable seal members 74, which may be of asbestos or any other suitable material depending on the type of fluid passing through the coupling, are disposed between the U-bolt assembly 60 and the pipe sections 10 and 14. If necessary or desirable, a suitable adhesive may be used to secure the seal members 74 in their proper position.

Thus, a pipe coupling is provided in which a branch pipe approaches a through pipe at an angle and is secured to the through pipe for flow in both of the pipe sections. With elongated ramp means on each of the pipe sections, secure surface-to-surface engagement is maintained. With proper deformation and arrangement of the parts, line contact of each of the pipe sections relative to the other is maintained, contributing to more efficient sealing of the pipe coupling and in such a way as to take up tolerances or minor imprecisions in the location of one pipe section relative to the other. It will also be apparent that the coupling may be used to attach an acoustical device to an exhaust pipe, or the like, wherein acoustical conductance, rather than gas flow, is provided through the branch pipe to such acoustical device. The overall result is an extremely efficient and economical pipe coupling which may be utilized in any system to accomplish the desired purpose.

It will be apparent that various changes will occur to those having skill in the art after having had reference to the foregoing description and drawings. However, it is not intended to limit the scope of the invention by the foregoing.

Having thus described the invention, I claim:

1. A pipe coupling for a through pipe and a branch pipe approaching said through pipe at an angle and comprising a through pipe having ramp means formed intermediate the ends thereof and extending between integral first and second portions of the through pipe at said angle relative to the axis thereof and terminating in a branch opening in said through pipe, a branch pipe formed with a partial wall extension protruding beyond the opening in one end and having a portion adjacent said one end received on said ramp means on said through pipe and with said wall extension of the branch pipe engaging the second portion of said through pipe at a location spaced from said ramp means, and means for securing said pipes in said engaged position.

2. A pipe coupling for a branch pipe and a through pipe and comprising a through pipe having a transverse slot therein and a portion adjacent said slot transversally arcuate and longitudinally angularly deformed, a branch pipe having a transverse slot therein spaced from the end thereof and a portion between said slot and said end being collapsed toward the opposite wall thereof to be transversely arcuate, said portion being longitudinally angularly disposed relative to the remainder of said branch pipe, said branch pipe being received on said portion of said through pipe with one edge of each of said slots in adjacent relation and with said portion of said branch pipe engaging and overlying said through pipe, and means for securing said pipes in engagement with each other.

3. A pipe coupling for a through pipe and a branch pipe approaching said through pipe at an angle and comprising a through pipe having a transverse slot therein and a portion adjacent said slot inwardly deformed to be transversally arcuate and disposed at said angle relative to the axis of said through pipe, a branch pipe having a transverse slot spaced from the end thereof and having a portion between said slot and said end collapsed inwardly toward the opposite wall thereof, said inwardly collapsed portion being at said angle relative to the axis of said branch pipe, said branch pipe engaging said inwardly deformed portion of said through pipe and with said collapsed portion of said branch pipe engaging said through pipe on the opposite side of said through pipe from said deformed portion of said through pipe, said transverse slots being in adjacent relation, and means for securing said pipes in said engagement.

4. The pipe coupling set forth in claim 3 wherein said portion of said through pipe on the opposite side of said slot from said deformed portion thereof is partially reduced in diameter to be substantially the same diameter as said collapsed portion of said branch pipe.

5. The pipe coupling set forth in claim 3 wherein said securing means includes a U-bolt and saddle assembly extending around said branch pipe and said through pipe on one side of said slots.

6. The pipe coupling set forth in claim 5 wherein said securing means further includes a second U-bolt and saddle assembly extending around said branch pipe and said through pipe and on the opposite side of said slots from said first assembly.

7. The pipe coupling set forth in claim 6 wherein said branch pipe is deformed at the side opposite therefrom from said transverse slot to provide a platform disposed in generally parallel relation to said axis of said through pipe, and said second U-bolt and saddle assembly engages said platform.

8. The coupling means set forth in claim 3 and further including sealing means engaging said through pipe and said branch pipe adjacent said slots and on opposite sides of said coupling.

9. The coupling means set forth in claim 8 wherein said sealing means are clamped against said through pipe and said branch pipe by said second U-bolt and saddle assembly.

10. A pipe coupling comprising first and second pipes having their axes intersecting at a predetermined angle, the first pipe having first and second convex outer wall portions extending parallel to its axis and a concave ramp therebetween in the outer wall portion extending from a juncture with said first convex portion and terminating in the axial vicinity of the adjacent end of the second convex wall portion thereby defining confluent branch and through passages in said first pipe, the second pipe having a convex outer wall portion adjacent one end extending parallel to its axis and conforming to the concave wall portion of the first pipe in surface contact therewith, the second pipe also having a partial wall extension protruding beyond the opening in said one end and extending at said angle with reference to its axis, said wall extension conforming to the second convex wall portion of the first pipe in surface contact therewith, the opening in the second pipe communicating with the branch passage in said first pipe, and means for clamping said first and second pipes together to maintain substantially fluid tight seals in the areas of surface contact of said conforming wall portions.

11. The pipe coupling as defined in claim 10 wherein the second convex wall portion of the first pipe and the convex wall portion of said second pipe terminate in the same plane whereby said ends are disposed in abutting engagement to provide a substantially fluid tight seal in the region between the areas of surface contact of said conforming wall portions.

12. The pipe coupling as defined in claim 10 wherein sealing means are disposed between adjacent ends of the first and second pipes, said sealing means being supported by said clamping means.

References Cited

UNITED STATES PATENTS

| | | | |
|---|---|---|---|
| 2,479,578 | 8/1949 | Sangvand | 285—189 X |
| 2,705,158 | 3/1955 | Risley | 285—199 X |
| 2,847,835 | 9/1958 | Cooper et al. | 285—155 X |
| 2,881,017 | 4/1959 | Millar | 285—188 X |

FOREIGN PATENTS

| | | |
|---|---|---|
| 131,178 | 1900 | Germany. |
| 201,710 | 12/1938 | Switzerland. |

DAVID J. WILLIAMOWSKY, Primary Examiner

W. L. SHEDD, Assistant Examiner

U.S. Cl. X.R.

285—199, 420